United States Patent [19]
Gloden et al.

[11] Patent Number: 5,313,160
[45] Date of Patent: May 17, 1994

[54] MODULAR MAGNETOSTRICTIVE DISPLACEMENT SENSOR HAVING A WAVEGUIDE PROTECTED BY A MATERIAL WITH A THERMAL COEFFICIENT OF EXPANSION THE SAME AS THE WAVEGUIDE

[75] Inventors: Michael L. Gloden, Apex; Wade D. Peterson, Morrisville; Lawrence J. Russell, Knightdale, all of N.C.

[73] Assignee: MTS Systems Corporation, Eden Prairie, Minn.

[21] Appl. No.: 829,443

[22] Filed: Feb. 3, 1992

[51] Int. Cl.$^5$ ............................................. G01B 7/26
[52] U.S. Cl. ........................ 324/207.13; 324/207.24; 324/207.12
[58] Field of Search ................... 324/207.12, 207.13, 324/207.22, 207.24, 235, 262

[56] References Cited

U.S. PATENT DOCUMENTS

| | | | |
|---|---|---|---|
| 4,952,873 | 8/1990 | Tellerman | 324/207.13 |
| 5,136,884 | 8/1992 | Lovett | 324/207.13 |

FOREIGN PATENT DOCUMENTS

| | | |
|---|---|---|
| 2523719 | 9/1983 | France . |
| 9114151 | 9/1993 | PCT Int'l Appl. . |

Primary Examiner—Walter E. Snow
Attorney, Agent, or Firm—Merchant, Gould, Smith, Edell, Welter & Schmidt

[57] ABSTRACT

A modular magnetostrictive displacement sensor is disclosed having a waveguide of magnetostrictive material extending from a first housing and protected by a member of fiber reinforced composite material. There is circuitry in the first housing for generating electrical pulses along the waveguide and a converter for generating an electrical signal in response to a torsion pulse in the waveguide caused by a magnet disposed proximate the waveguide when the electrical pulse passes the magnet position. In one embodiment the waveguide and its protective member is received within a second housing. One or more magnets may be mounted within the second housing or externally on or near the second housing for movement to the waveguide. Alternatively the sensor may be used without the second housing.

6 Claims, 5 Drawing Sheets

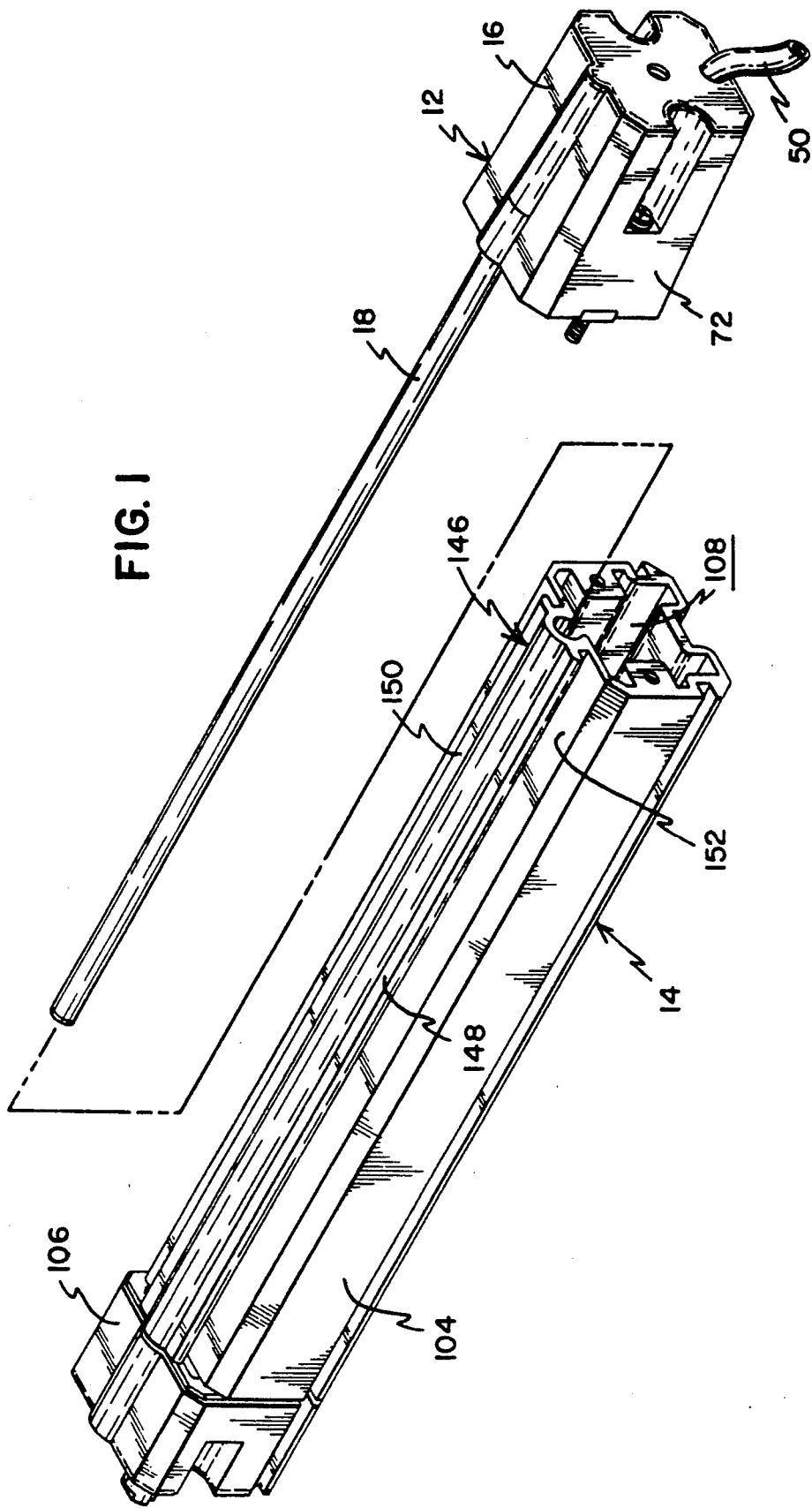

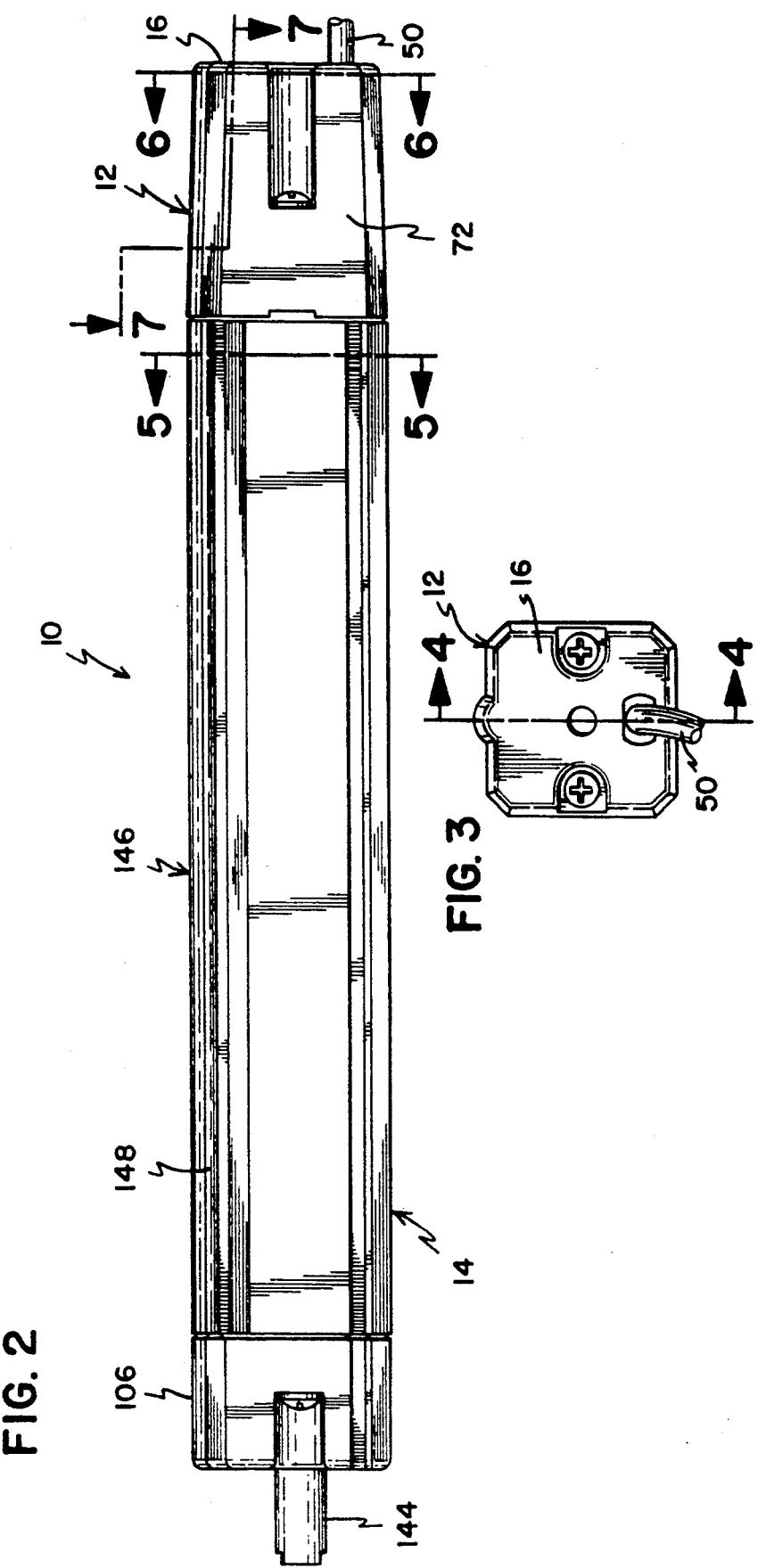

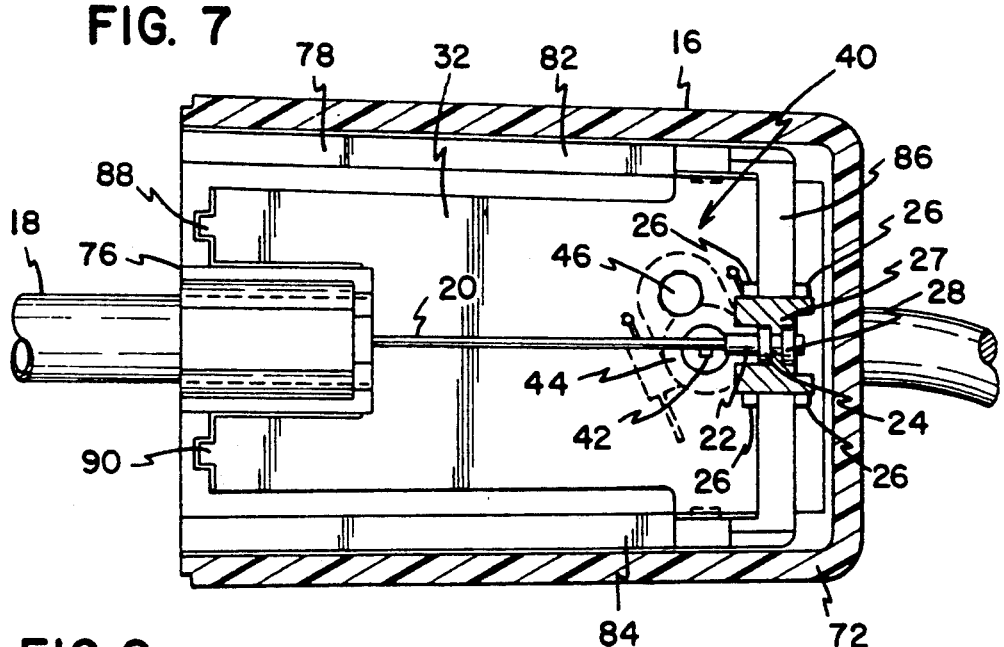
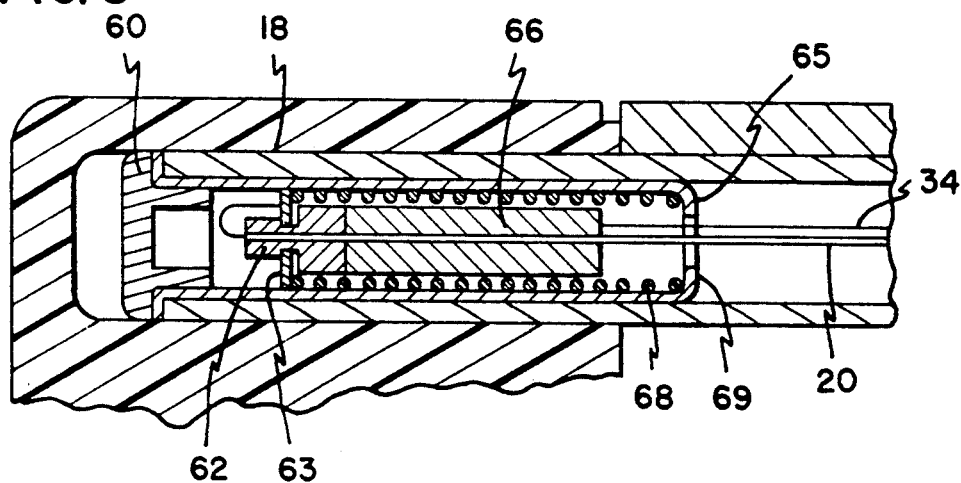

MODULAR MAGNETOSTRICTIVE DISPLACEMENT SENSOR HAVING A WAVEGUIDE PROTECTED BY A MATERIAL WITH A THERMAL COEFFICIENT OF EXPANSION THE SAME AS THE WAVEGUIDE

BACKGROUND OF THE INVENTION

The present invention relates to a position sensor and, in particular, to a position sensor which operates according to the principles described in U.S. Pat. No. 3,898,555 to Tellerman. In general, such devices incorporate a sonic waveguide cooperating with a magnet. The waveguide and magnet are mounted for movement with respect to each other. The device operates according to the principles of the Wiedemann effect. An electrical pulse is generated resulting in a magnetic field concentrated in the waveguide. The magnetic field of the cooperating magnet causes a sonic torsional pulse to be generated and travel along the waveguide. This sonic torsional pulse is converted to an electrical signal. The time interval between the current pulse and the reception of the sonic torsional pulse is representative of the location or position of the magnet along the waveguide. Such devices therefore provide an accurate indication of linear displacement, for example, in machine tool applications where the location of a machine element must be determined for the control of machine functions.

The prior art also includes variable potentiometer devices which have been a primary absolute displacement measuring sensor because of the simplicity of their operation, low cost, accuracy, and the ease with which they interface with electronics. On the other hand, this type of prior art sensor has several disadvantages. The potentiometer has a sliding contact and resistance element, both of which tend to wear with extensive use. The wiper contact is sensitive to contamination that in many machine applications is difficult to control or eliminate. The cost of such devices is also increased if it is necessary to convert the analog signal output of the potentiometer for use with digital controls.

Balluff of Germany has introduced a non-contact magnetostrictive displacement sensor which eliminates the disadvantages of potentiometer-type devices. However, the Balluff device appears to have relatively limited application wherein the magnet is mounted externally on the device housing for movement relative thereto. Also, the Balluff device does not achieve the cost benefits associated with potentiometer-type devices.

The present invention is directed toward providing a low cost magnetostrictive displacement sensor of modular design whereby it is adaptable to a wide range of machine requirements and applications and which incorporates other advantages of variable potentiometer devices without their disadvantages.

SUMMARY OF THE INVENTION

The present invention is a modular magnetostrictive displacement sensor capable of use in a wide variety of applications. It includes a first housing in which a waveguide formed of magnetostrictive material is mounted with the waveguide extending from the housing. A means for protecting the waveguide surrounds the waveguide and in the preferred embodiment is a fiber reinforced composite material. There is provided a means for generating electrical pulses in a direction along the waveguide and a converter means is mounted in the first housing to generate an electrical signal in response to a torsion pulse in the waveguide caused by at least one magnet adjacent the waveguide when an electrical current passes along the waveguide. There is a means responsive to the electrical signal for indicating the position of the magnet along the waveguide. In a preferred embodiment, the waveguide is received within a second housing attached to said first housing. The second housing has a means for mounting a magnet therein for movement in a direction along the longitudinal axis of the waveguide. The second housing is also provided with a means for mounting a magnet thereto externally on the housing also for movement in a direction along the longitudinal axis of the waveguide. In either embodiment means are provided to restrain the magnet from moving laterally with respect to the waveguide longitudinal axis.

The displacement sensor of the present invention can be used in one application without the second housing. In such applications, at least one magnet is positioned with respect to the waveguide for movement relative to the waveguide along its longitudinal axis. For example, the displacement sensor may be mounted in a fixed position with the magnet mounted in close proximity to the waveguide on a movable machine member.

In other applications, the alternative embodiments of mounting the movable magnet within the second housing or on guide means externally on the second housing may be desirable. The fiber reinforced composite protective member for the waveguide in the device of the present invention is particularly advantageous in that its thermal coefficient of expansion is very close to that of the waveguide material itself. Because the waveguide in some embodiments is under tension, matching the thermal coefficient of expansion properties of the protective member with the waveguide stabilizes the sensor output signal and lowers measurement hysteresis.

These and other advantages of the present invention will become apparent with reference to the accompanying drawings, detailed description of the preferred embodiment and claims.

BRIEF DESCRIPTION OF THE DRAWINGS

FIG. 1 is a view in perspective illustrating the modular construction of the magnetostrictive displacement sensor of the present invention;

FIG. 2 is a view in elevation of one embodiment of the present invention;

FIG. 3 is an end view of the embodiment of FIG. 2;

FIG. 7 is a view in partial cross-section taken generally along the lines 7—7 of FIG. 2;

FIG. 8 is an enlarged fragmentary sectional view illustrating an alternative embodiment of the present invention wherein the waveguide is mounted under tension.

DETAILED DESCRIPTION OF THE PREFERRED EMBODIMENT

Figure 4:
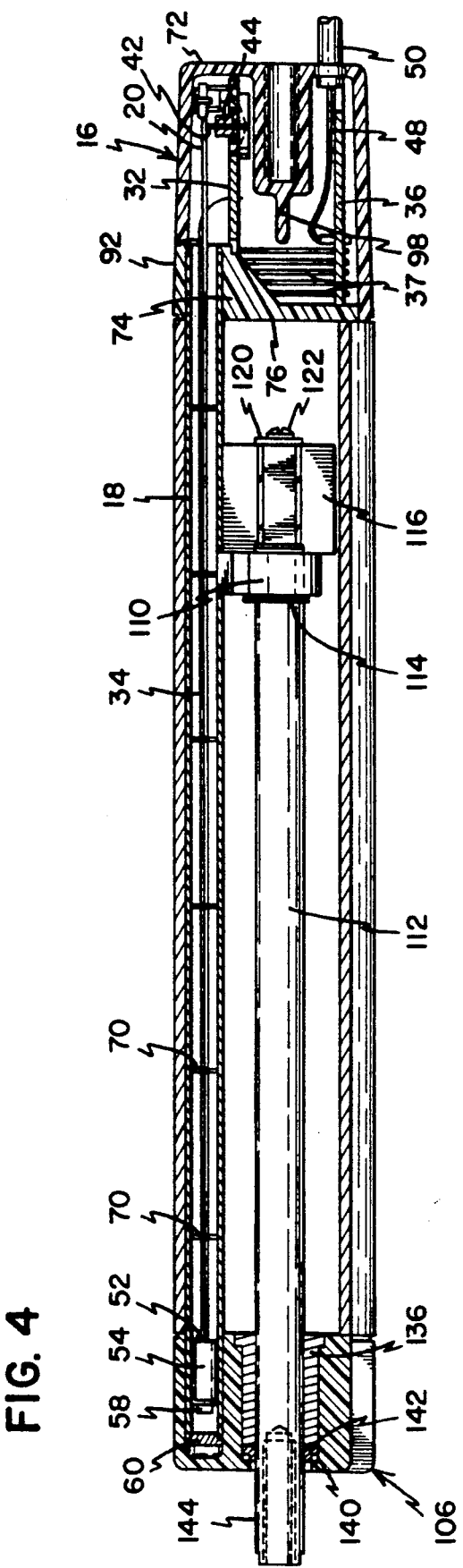
FIG. 4 is a cross-sectional view taken generally along the lines 4—4 of FIG. 3.

Referring to the drawings wherein like numerals represent like parts throughout the several views, the modular magnetostrictive displacement sensor of the present invention is illustrated generally at 10. Sensor 10 includes a first member 12 and a second member 14. First member 12 can be used in some applications independently of second member 14. First member 12 includes a first housing 16. Extending from housing 16 is a tubular waveguide protective member 18. As will be described in more detail later, protective member 18 is in the preferred embodiment formed of a fiber reinforced composite material.

As shown in more detail in FIGS. 3-7, a magnetostrictive waveguide 20 has one end fixed to a mounting member 22 having a flange portion 24 anchored in a bracket 26 within housing 16. Mounting member 22 is secured within bracket 26 by an anchor cap 27 which snap fits between lugs 26 on end portion 86 of first frame member 78.

Waveguide 20 is of the type well known in the prior art as shown, for example, in the Tellerman '555 patent referenced above. It is a tubular member formed of magnetostrictive material such as NI-SPAN-C alloy. An electrical conductive wire (not shown) extends through the tubular member of waveguide 20 for transmitting electrical pulses along the direction of the waveguide. An electrical return wire 34 completes the pulse circuit. Electrical circuitry for generating the electrical pulses that are transmitted along waveguide 20 is well known in the prior art and in the present invention such circuitry may be incorporated and/or mounted on printed circuit board 32. A second printed circuit board 36 may also be mounted within housing 16 and carry additional electrical circuit components for the generation of the pulse signals and/or the processing of the return signal representative of the position of a magnet along waveguide 20. Again, such circuitry is also well known to those of ordinary skill in the art. A plurality of pins 37 interconnect the circuit elements on printed circuit boards 32 and 36. In an alternative embodiment a flexible ribbon conductor may be used in place of rigid pins 37.

A converter means 40 is mounted on printed circuit board 32 within housing 16. As is known in the prior art, converter means 40 functions to generate an electrical signal in response to a torsion pulse in the waveguide 20 which is caused by a magnet positioned along the waveguide when an electrical pulse passes along the waveguide (the Wiedemann effect). In the preferred embodiment of the present invention, converter means 40 is like that disclosed in U.S. Pat. No. 4,803,427 in that it includes a single transducer tape 42 attached to waveguide 20 at one end of tape 42. Tape 42 extends within an electrical coil 44 mounted in printed circuit board 32 and the end of tape 42 within coil 44 may or may not be anchored to coil 44. A permanent magnet 46 provides a magnetic biasing field for tape 42 and coil 44 according to the principles of what is known as the Villari effect. Movement of transducer tape 42 within coil 44 in response to a torsion pulse in waveguide 20 causes a change in the magnetic induction in coil 44 inducing a voltage in coil 44. The time interval between the electrical pulse that is transmitted along waveguide 20 and the electrical signal generated in coil 44 is a measure of the distance of a magnet positioned along waveguide 20 from a referenced position. It is well known to one of ordinary skill in the art to process the signal either digitally or by analog techniques to give an indication of position of the magnet along waveguide 20. One or more electrical conductors 48 may be provided to transmit power to the sensor from an external power source and transmit the processed signal information from sensor 10 through a conductor cable 50 extending from housing 16.

In one embodiment of the present invention, waveguide 20 is secured within protective member 18 without placing waveguide 20 under tension. In this embodiment as specifically shown in FIG. 4, an end 52 of waveguide 20 is mounted to a damping member 54. Damping member 54 is provided to minimize reflections of sonic pulses from the terminal end of waveguide 20. Damping member 54 may be a rubber pad clamped about waveguide 20 which fits loosely within protective member 18. The construction of such damping elements is also well known in the art. A waveguide tail anchor 58 is affixed directly to waveguide 20. Protective member 18 is closed by a tube plug 60.

In an alternative embodiment, waveguide 20 may be mounted within protective member 18 under tension. In this embodiment as specifically shown in FIG. 8, a modified tail anchor 62 is secured to waveguide 20. A damping member 66 is also provided in this embodiment. A spring cup 65 is enchored by tube plug 60 to protective member 18 and extends about waveguide 20 and damping member 66. A spring retainer 63 is affixed to tail anchor 62 within a slot formed therein. Waveguide 20 is placed under tension by a spring 68 which engaged spring retainer 63 at one end and spring cup 65 at an end 69 thereof. A means may be provided to adjust the tension on spring 68 and thereby the tension on waveguide 20. The main reason for providing tension on waveguide 20 is to center waveguide 20 within protective member 18 thereby improving the accuracy of the device. Spring 68 is an extension spring. As shown in FIG. 4, a plurality of spacers 70 may be positioned about waveguide 20 along protective member 18 to support waveguide 20. Generally there is a somewhat loose fit between spacers 70 and protective member 18. This loose fit allows easy waveguide piping during manufacturing operations and wider tolerances in spacers 70 and internal dimensions of protective member 18. Accordingly, during normal operation of the sensor, waveguide 20 moves within housing 18 in response to orientation, shock and vibration. This subjects waveguide 20 to slightly varying magnetic field intensities from a magnet in proximity thereto causing potential errors in sensor measurement. Tensioning waveguide 20 effectively controls and minimizes these effects through providing the centering benefit.

First housing 16 is in two parts comprising a first member 72 and a second member 74. Second member 74 has a base 76, a first frame member 78, and a second frame member 80. Frame member 78 has side portions 82 and 84 and an end portion 86. Waveguide mounting member 26 is integrally formed in end portion 86 of frame member 78. Printed circuit board 32 snap fits to frame member 78 and has a pair of tab portions 88 and 90 which are received within mating slots formed in base 76 as shown more specifically in FIG. 7. First frame member 78 also has a bracket portion 92 in which is received waveguide protective member 18. Printed circuit board 36 also snap fits to second frame member 80 which has a pair of projecting tabs 94 and 96 which frictionally fit within holes (not shown) in printed circuit board 36. First member 72 of housing 16 has an internal partition wall 98 functioning to define housing chambers 100 and 102 in which printed circuit boards 32 and 36 are received, respectively. First and second members 72 and 74 are secured together by conventional fastening means such as screws so that they can be readily separated. The construction of first housing 16 including the snap fit placement of printed circuit boards 32 and 36 provides for ease of assembly as well as repair and replacement of component parts.

Figure 5:
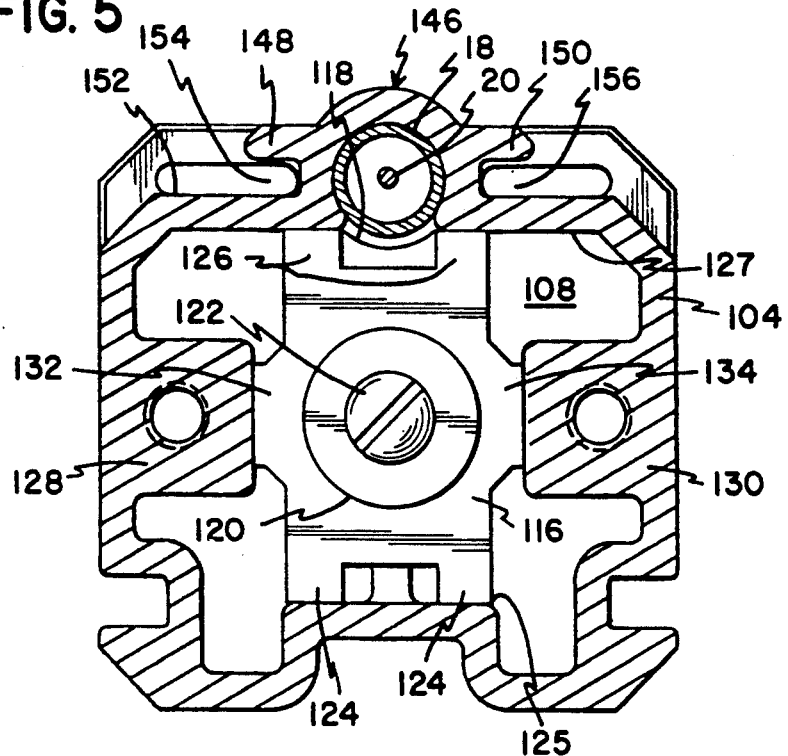
FIG. 5 is a cross-sectional view taken generally along the lines 5—5 of FIG. 2.
Figure 6:
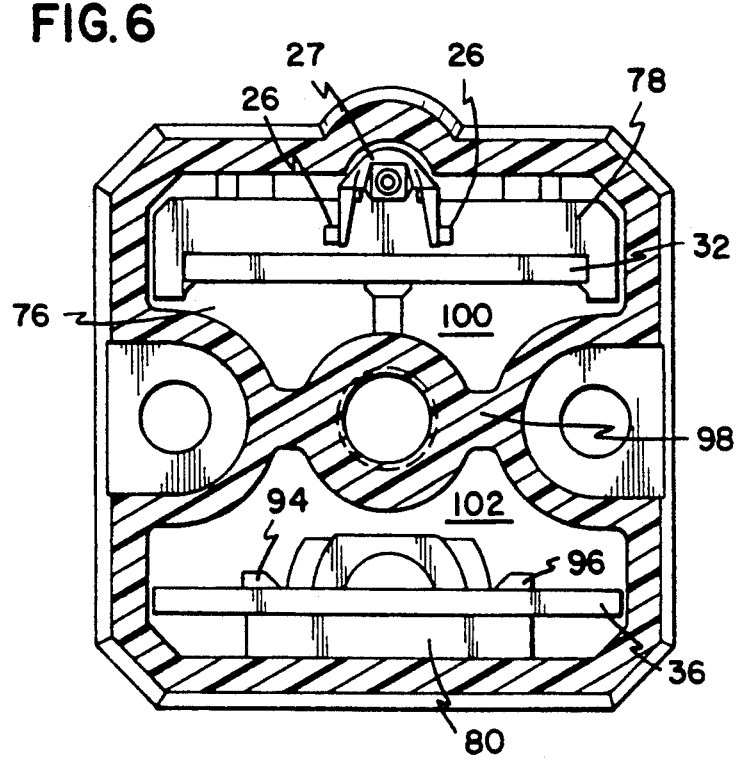
FIG. 6 is a cross-sectional view taken generally along the lines 6—6 of FIG. 2.

In one embodiment of the present invention, first member 12 is coupled to second member 14 as illustrated more specifically in FIGS. 2-5. Second member 14 comprises an extruded housing 104 and an end cap 106. Housings 104 and 16 are preferably formed of a non-magnetic material. Housing 104 can be provided in the length necessary for a particular application. Housing 104 defines an elongated chamber 108 in which may be mounted a magnet 110. Magnet 110 is secured on a rod 112 between a retainer ring 114 and a bearing member 116. Magnet 110 has a concave surface at 118 as shown in FIG. 5 with a radius of curvature corresponding generally to the radius of curvature of tubular protective member 18. Bearing member 116 is attached to rod 112 by means of a conventional washer and screw 120 and 122, respectively. As shown more specifically in FIG. 5, bearing member 116 has pairs of guide rails 124 and 126 oppositely disposed in sliding engagement with an inner surface 125 and 127 of extruded housing 104, respectively. Extruded housing 104 has a pair of oppositely disposed guide tracks 128 and 130 extending longitudinally within chamber 108. Bearing member 116 has another pair of guide rails 132 and 134 which slidably engage guide tracks 128 and 130, respectively. In this construction, magnet 110 may move freely along the longitudinal axis of waveguide 20, but is restrained from movement in a direction generally laterally with respect to waveguide 20. At its end opposite magnet 110, rod 112 is received within a bearing 136 which is held in end cap 106. An O-ring 140 seals rod 112 and is disposed between a recessed surface of end cap 106 and a wiper member 142. In the embodiment illustrated in FIGS. 2-5, sensor 10 may be mounted in a stationary position with end 144 of rod 112 attached by known means such as ball joints, studs, or clevis ends to a moving member. As magnet 110 moves within chamber 108 along waveguide 20, the torsion wave generated in waveguide 20 represents the position detected by the device.

An external guide track 146 may be provided as an alternative mounting means for a magnet corresponding to magnet 110. As shown in more detail in FIGS. 1 and 2, guide track 146 extends longitudinally along the length of housing 104 with a pair of flange portions 148 and 150 spaced above a surface 152 to define channels 154 and 156 in which mating legs (not shown) of a magnet may be captured. In this embodiment sensor 10 and the associated externally guided magnet are again mounted for movement with respect to each other with the magnet allowed to move freely along the longitudinal axis of waveguide 20 but restrained from movement laterally with respect to waveguide 20. In a similar alternative embodiment, a magnet may be mounted separately from sensor 10 yet in close proximity to waveguide 20.

In operation the present invention is useful in a wide variety of applications requiring linear displacement sensors. First member 12 can be used alone or in combination with second member 14. When used in combination, the magnet movable with respect to the waveguide may be mounted within housing 104 or externally either on the housing or separate therefrom. While the present invention has been disclosed as incorporating one magnet, multiple magnets may be used as well each mounted for movement with respect to waveguide 20 as described herein.

Waveguide protective member 18 as previously described is formed of a fiber reinforced composite material. In one embodiment it may be fiberglass reinforced plastic which is a plastic resin matrix reinforced by embedded glass fibers. A high temperature vinyl-ester resin with ultraviolet stabilizers is suitable with a 60% to 70% glass fiber filler providing a low temperature coefficient of expansion, high strength and high rigidity. Other filler materials such as quartz and carbon fibers may also be used. Protective member 20 may be formed by a pultrusion process which is well known in the art. An alternative manufacture method is a filament winding technique also known in the art. The filament winding method provides benefits similar to that achieved by the pultrusion process.

In embodiments where the waveguide 20 is placed under tension within protective housing 18, the use of the fiber reinforced composite material functions to more effectively control waveguide tension. This is because the temperature coefficient of expansion of the fiber reinforced composite material can be closely matched to that of the waveguide material which in a preferred embodiment is as previously described NI-SPAN-C alloy. With closely matched temperature coefficients of expansion, the extension of spring 68 is maintained nearly constant thereby minimizing the adverse effects of temperature on the sensor accuracy.

From the above description, it can be appreciated that the present invention provides a modular magnetostrictive displacement sensor capable of use in many varied applications. In addition to being easily adapted to a wide range of machine requirements, it has the cost benefits of the prior art variable potentiometer-type sensors while at the same time illuminating the disadvantages of such sensors such as sliding contact and resistance element wear and susceptibility to contamination. Moreover the present invention incorporating a fiber reinforced composite protective member for the magnetostrictive waveguide facilitates maintaining consistent and constant waveguide tensioning eliminating the adverse effects on sensor accuracy caused by thermal expansion. While specific embodiments are disclosed herein, it is understood that equivalent structures are also contemplated within the spirit and scope of the present invention.

What is claimed is:

1. A magnetostrictive displacement sensor comprising:
    a first housing;
    a waveguide formed of magnetostrictive material and having a first and second ends;
    means for mounting said first end of said waveguide in said first housing with said waveguide extending from said first housing;
    a protected member surrounding said waveguide, said protective member formed of material having the thermal coefficient of expansion substantially the same as the thermal coefficient of expansion of said waveguide magnetostrictive material;
    at least one magnet disposed proximate said waveguide;
    means for generating electrical pulses in a direction along said waveguide;

a converter means mounted in said first housing for generating an electrical signal in response to a torsion pulse in said waveguide caused by said at least one magnet when an electrical current pulse passes along said waveguide, at least one of said waveguide and said at least one magnet movable with respect to each other;

means responsive to said electrical signal for indicating the position of said at least one magnet along said waveguide.

2. A magnetostrictive displacement sensor in accordance with claim 1 further comprising means for mounting said second end of said waveguide and applying tension to said waveguide along its longitudinal axis.

3. A magnetostrictive displacement sensor in accordance with claim 2 wherein said mounting and tensioning means further comprises a spring having one end thereof fixed to said protective member and an opposite end thereof fixed to said waveguide.

4. A magnetostrictive displacement sensor comprising:

a first housing;

a waveguide formed of magnetostrictive material, said waveguide having first and second ends;

means for mounting said first end of said waveguide in said first housing with said waveguide extending from said first housing;

a protective member surrounding said waveguide and formed of material having a thermal coefficient of expansion substantially the same as the thermal coefficient of expansion of said waveguide magnetostrictive material;

at least one magnet disposed proximate said waveguide;

means for generating electrical pulses in a direction along said waveguide;

a printed circuit board removably mounted within said first housing;

a converter means mounted on said printed circuit board for generating an electrical signal in response to a torsion pulse in said waveguide caused by said at least one magnet and created by the Wiedemann effect, at least one of said waveguide and said at least one magnet moveable with respect to the other;

means responsive to said electrical signal for indicating the position of the magnet along said waveguide.

5. A magnetostrictive displacement sensor in accordance with claim 4 wherein said protective member is formed of fiber reinforced composite material.

6. A magnetostrictive displacement sensor in accordance with claim 4 wherein said converter means comprises a transducer tape affixed at one end to said waveguide and an electrical coil, said tape received within said coil.

* * * * *